(12) United States Patent
Dai et al.

(10) Patent No.: US 10,860,590 B2
(45) Date of Patent: Dec. 8, 2020

(54) METHOD AND APPARATUS OF INFORMATION PROCESSING

(71) Applicant: EMC IP Holding Company LLC, Hopkinton, MA (US)

(72) Inventors: Duke Hongtao Dai, Shanghai (CN); Winston Lei Zhang, Shanghai (CN); Kun Wu (Sheperd) Huang, Shanghai (CN); Charlie Chao Chen, Shanghai (CN); Jingjing Liu, Shanghai (CN)

(73) Assignee: EMC IP Holding Corporation LLC, Hopkinton, MA (US)

( * ) Notice: Subject to any disclaimer, the term of this patent is extended or adjusted under 35 U.S.C. 154(b) by 240 days.

(21) Appl. No.: 15/954,662

(22) Filed: Apr. 17, 2018

(65) Prior Publication Data
US 2018/0307689 A1   Oct. 25, 2018

(30) Foreign Application Priority Data
Apr. 17, 2017   (CN) .......................... 2017 1 0250544

(51) Int. Cl.
*G06F 16/2457* (2019.01)
*G06F 16/22* (2019.01)
*G06F 16/332* (2019.01)

(52) U.S. Cl.
CPC .... *G06F 16/24578* (2019.01); *G06F 16/2246* (2019.01); *G06F 16/3326* (2019.01)

(58) Field of Classification Search
USPC ................................................. 707/723, 728
See application file for complete search history.

(56) References Cited

U.S. PATENT DOCUMENTS

| 7,860,867 B2 * | 12/2010 | Kan ..................... G06F 3/04847 707/739 |
| 7,987,169 B2 * | 7/2011 | Epstein ................. G06F 16/951 707/706 |
| 8,307,066 B2 * | 11/2012 | Carter .................... G06Q 30/02 709/223 |
| 8,595,223 B2 * | 11/2013 | D'Urso ............. G06F 16/24578 707/726 |
| 8,625,464 B2 | 1/2014 | Fachan |
| 8,775,356 B1 | 7/2014 | Chen et al. |
| 9,235,638 B2 * | 1/2016 | Gattiker ................. G06F 16/93 |
| 9,904,949 B1 * | 2/2018 | Tavernier ........... G06Q 30/0631 |
| 10,073,682 B1 | 9/2018 | Totale |
| 10,460,328 B2 * | 10/2019 | Kapoor ............. G06Q 30/0282 |
| 10,509,814 B2 * | 12/2019 | Lastra Diaz ...... G06F 16/24522 |
| 10,558,933 B2 * | 2/2020 | Bhowan ................ G06N 20/00 |
| 10,592,575 B2 * | 3/2020 | Barve ..................... G06F 40/40 |
| 10,691,425 B2 | 6/2020 | Totale |
| 2010/0106719 A1* | 4/2010 | Donato ................. G06F 16/355 707/728 |

(Continued)

*Primary Examiner* — Cam Linh T Nguyen
(74) *Attorney, Agent, or Firm* — BainwoodHuang (57) ABSTRACT

The present disclosure provides method and apparatus of information processing. The method comprises: in response to a request of a first user for first information, searching a database to obtain second information; determining a first relevance between a second user associated with the second information and the first user; determining a second relevance between the second information and the first information based on the first relevance; and presenting the second information to the first user based at least in part on the second relevance.

16 Claims, 6 Drawing Sheets

(56) References Cited

U.S. PATENT DOCUMENTS

| | | | |
|---|---|---|---|
| 2011/0106850 A1* | 5/2011 | Li | G06F 16/335 |
| | | | 707/780 |
| 2012/0143921 A1* | 6/2012 | Wilson | G06F 16/284 |
| | | | 707/798 |
| 2014/0040370 A1* | 2/2014 | Buhr | H04L 67/306 |
| | | | 709/204 |
| 2015/0363403 A1* | 12/2015 | Khalatov | G06Q 10/107 |
| | | | 707/723 |
| 2016/0124958 A1* | 5/2016 | Sinha | G06F 16/9535 |
| | | | 707/733 |
| 2016/0328406 A1* | 11/2016 | Convertino | G06F 3/04842 |

* cited by examiner

METHOD AND APPARATUS OF INFORMATION PROCESSING

RELATED APPLICATIONS

This application claim priority from Chinese Patent Application Number CN201710250544.7, filed on Apr. 17, 2017 at the State Intellectual Property Office, China, titled "INFORMATION PROCESSING METHOD AND DEVICE" the contents of which is herein incorporated by reference in its entirety.

FIELD

The present disclosure relates to the field of information processing, and particularly to a method of information processing and an apparatus of information processing for improving information relevance.

BACKGROUND

As technologies of information search prevail, more and more enterprises provide enterprise search engines for fulltext search. Regarding a fulltext search engine, what a user concerns is relevance between information obtained by the search (referred to as "searched information") and desired information of the user, i.e., whether a document obtained from a database or information represented by the document is relevant or irrelevant to the desired information of the user. There might be many pieces of relevant information obtained from the database and presented to the user, but relevant degrees between these pieces of information and the desired information of the user may be different from each other. The relevant degree is usually represented by a quantized relevance. The higher a value of the relevance is, the higher the relevant degree between the searched information and the desired information of the user is. Like conventional search engines, the enterprise search engines use various theories of fulltext search to calculate the relevance of search results. It is favorable to further improve the relevance between the searched information and the desired information of the user.

SUMMARY

Embodiments of the present disclosure provide a method of information processing and an apparatus of information processing.

In one aspect, there is provided a method of information processing, comprising: in response to a request of a first user for first information, searching a database to obtain second information; determining a first relevance between a second user associated with the second information and the first user; determining a second relevance between the second information and the first information based on the first relevance; and presenting the second information to the first user based at least in part on the second relevance.

In another aspect, there is provided an electronic device. The device comprises: a processing unit; and a memory coupled to the processing unit and having instructions stored thereon, the instructions, when being executed by the processing unit, causing the device to perform acts including: in response to a request of a first user for first information, searching a database to obtain second information; determining a first relevance between a second user associated with the second information and the first user; determining a second relevance between the second information and the first information based on the first relevance; and presenting the second information to the first user based at least in part on the second relevance.

In a further aspect, there is provided a computer program product. The computer program product is tangibly stored on a computer-readable medium and comprises instructions. The instructions, when executed on at least one processor, cause the at least one processor to perform the above method.

As compared with the conventional fulltext search engine which does not take into account the relevance between the searcher and the document user, the information processing method and the information processing apparatus according to embodiments of the present disclosure may further improve the relevance between the searched information and the desired information.

DETAILED DESCRIPTION

Preferred embodiments of the present disclosure will be described in more detail with reference to the accompanying drawings. Although the drawings show preferred embodiments of the present disclosure, it should be appreciated that the present disclosure may be implemented in various forms and should not be limited by embodiments described herein. On the contrary, these embodiments are provided to make the present disclosure more thorough and complete and fully convey the scope of the present disclosure to those skilled in the art.

As used herein, the term "include" and its variants are to be read as open terms that mean "include, but not limited to." The term "or" represents "and/or" unless otherwise particularly specified. The term "based on" is to be read as "based at least in part on." The term "an example embodiment" or "an embodiment" is to be read as "at least one example embodiment". The term "another embodiment" is to be read as "at least one other embodiment". Terms such as "first" and "second" may refer to different or identical objects. The text below might include other explicit and implicit definitions.

Relationship of people in an organization to which they belong (hereinafter briefly referred to as "relationship") is domain specific, and the relationship may be used to improve the relevant degree between the searched information and the desired information of the user (hereinafter referred to as "information relevance"). It's very likely one user is most interested in documents written by members in the user's team or interested group. For the user, documents written by members from another team or non-interested group may be less useful while documents written by members from another department may be of no use at all.

A conventional enterprise fulltext search engine will simply calculate the information relevance in the fulltext search based on TF/IDF (term frequency-inverse document frequency). A solution for the conventional enterprise fulltext search engine doesn't take the relationship or the relevant degree (briefly referred to as relevance) between the searcher and the document author into account, and irrelevant documents from other teams or departments may be returned with high priority.

The information processing method according to the present disclosure introduces a new boost factor for the information relevance in the fulltext search to measure the importance of the documents based on the relationship or the relevance between the searcher and the document author, thereby improving the relevance between the desired information of the searcher and the searched information. This relationship or relevance may be quantized. The higher a quantization value is, the closer the relationship between the searcher and document author is or the higher the relevance is. In other words, the higher the quantization value is, the field or interest point involved by the searcher and the document author might be closer, and the relevance between the desired information of the searcher and the document information written by the author might be higher.

This kind of quantization may be implemented by a tree. For example, groups in a company, such as team, department and organization, may be considered as internal nodes of the tree, while the people in the company may be considered as leaf nodes of the tree. In a certain train, the searcher is located at a node, and the document author is located at another node. In this case, the relationship or the relevance between the searcher and the document author may be represented by a distance between two nodes in the tree (hereinafter referred to as the distance). The smaller the distance is, the closer the relationship between the searcher and the document author is or the higher the relevance between the searcher and the document author is. Hence, consideration of the distance between the searcher and the document author may improve the information relevance, and it is possible to measure the importance or the information relevance of the documents based on the distance between the searcher and the document author.

Figure 1:
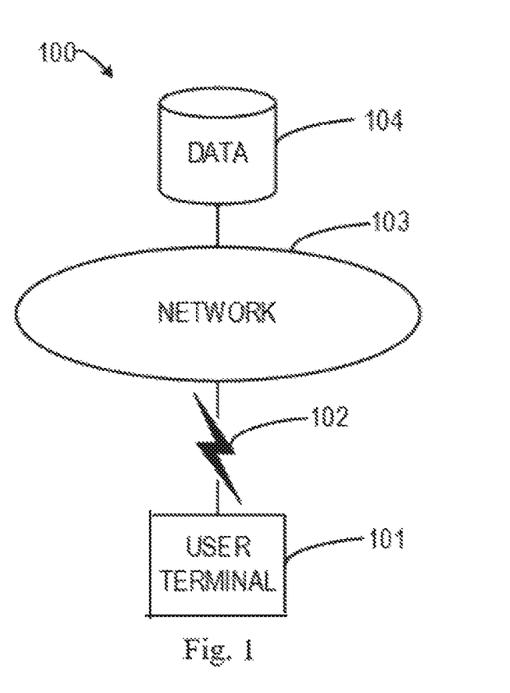
FIG. 1 illustrates an environment in which an information processing method according to an embodiment of the present disclosure may be implemented.

FIG. 1 illustrates an environment in which an information processing method according to an embodiment of the present disclosure may be implemented. As shown in FIG. 1, the environment 100 comprises a user terminal 101, a communication link 102, a network 103 and data 104. The user terminal 101 may be configured to receive a user's request for desired information, and may be coupled to the network 103 via the communication link 102. In response to the request, a search engine searches the data 104 on the network 103 to obtain searched information. The search engine returns the searched information to the user terminal 101. The user terminal 101 presents the information to the user. The search engine may be provided in the user terminal 101, or may be provided on the network 103. The data 104 may exist on the network 103 in any known form.

Figure 2:
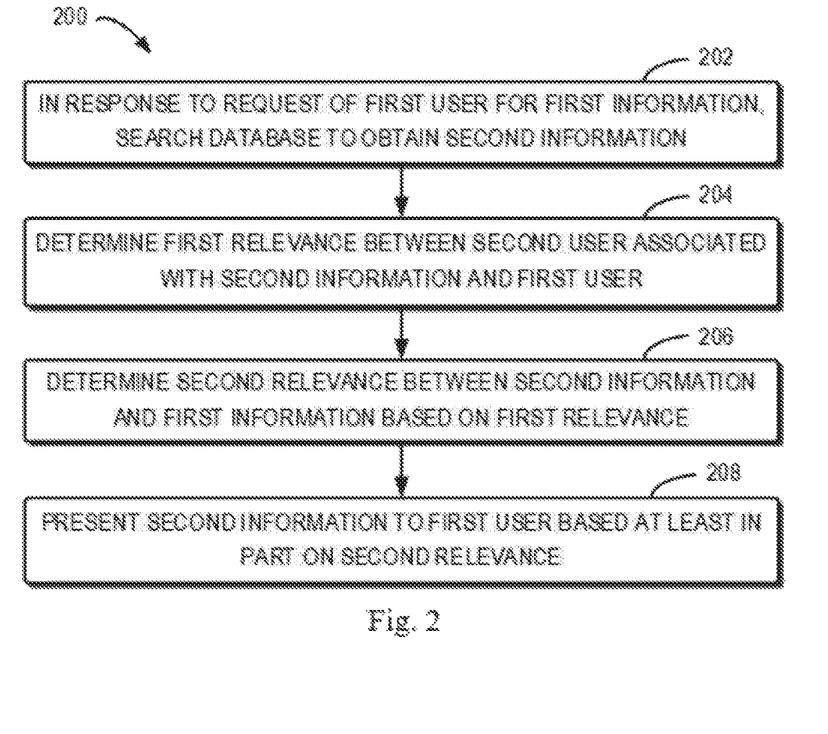
FIG. 2 illustrates a flow chart of an information processing method according to an embodiment of the present disclosure.

FIG. 2 illustrates a flow chart of an information processing method 200 according to an embodiment of the present disclosure. At block 202, in response to a request for desired information (referred to as "first information") from the searcher (referred to as "a first user"), a database is searched to obtain searched information (referred to as "second information"). For example, the first information searched by the first user may be latest research reports, technical developments and market dynamics regarding his points of interest. It is feasible to, according to a search condition provided by the first user, obtain the second information associated with the search condition by searching in the database. It will be appreciated that the second information obtained at block 202 may include many pieces of information. The pieces of information at least partially match with the search condition provided by the user, but they are not certainly the first information that the first user desires to obtain. For example, the second information may include meeting courseware, academic thesis, investigation reports or the like.

At block 204, the relationship or the relevance (referred to as "first relevance degree") between a user associated with the searched information (referred to as "a second user") and the first user is determined. Here, the relevance between two users represents a matching degree of contents concerned by the two users, a conformity degree of involved fields and the like.

In some embodiments, the second user may include an author, publisher or owner of the searched information. In addition, the relationship or the relevance between the second user and the first user may be determined based on the distance between the two users in the tree as described above.

In some embodiments, documents in the database are searched in response to the request of the first user for the fulltext search. The distance between the nodes of the first user and second user in the tree is calculated for each of the searched documents. The relevance between the first user and second user is determined based on the calculated distance, as a factor or weight for a final information relevance.

An example embodiment of calculating the distance between the first user and second user at block 204 will be described below with reference to FIGS. 3 and 4.

Figure 3:
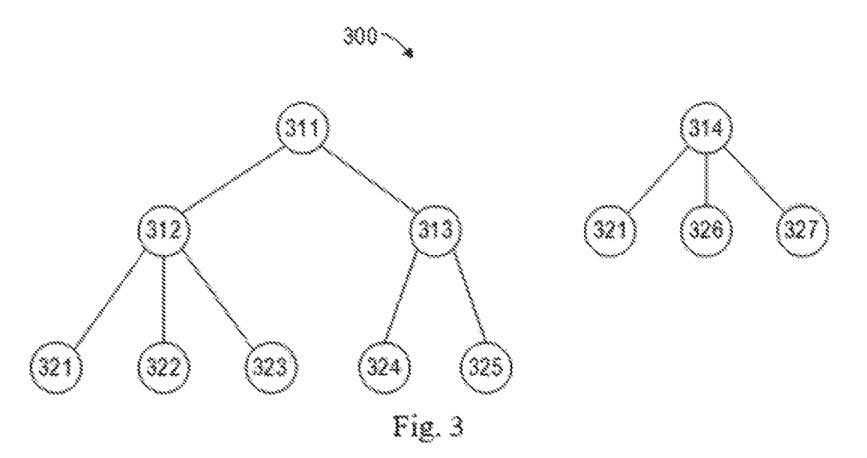
FIG. 3 illustrates a schematic diagram of a tree for representing relevance between a plurality of users according to an embodiment of the present disclosure.

FIG. 3 illustrates a schematic diagram of a tree for representing relevance between a plurality of users according to an embodiment of the present disclosure. In the embodiment shown in FIG. 3, the plurality of users may belong to different groups. These groups may be divided according to any proper relationship. For example, the groups may be determined according to organizational structures of departments in an organization, and people belonging to the same department are divided into the same group. Again for example, the users may be grouped according to any relationship of users, such as relatives relationship, friends relationship, social network relationship or the like.

In the embodiment shown in FIG. 3, grouping of users is represented by the tree 300. Non-leaf nodes in the tree represent the user groups, and leaf nodes represent users. In this example, the plurality of users are first divided into two groups, i.e., group 311 and group 314. The group 311 includes group 312 and group 313. User 321, user 322 and user 323 belong to the group 312, and user 324 and user 325 belong to group 313. In addition, user 321, 326 and user 327 belong to group 314.

The tree 300 is generated based on a structural diagram of the organization to which the plurality of users belong. According to embodiments of the present disclosure, the tree representing the relevance between the plurality of users not only applies to the structural diagram of the organization, but also to an enterprise content management system.

In some embodiments, the distance between two users may be defined as a distance from a node representing one user to a node representing another user in the tree. In the embodiment, the distance may be determined by the minimum number of edges to be traversed from one node to reach another node in the tree. Hereinafter, the node representing the user or the group is briefly referred to as a node of user or group.

For example, in the tree 300, the node of user 321 and the node of group 312 are connected via one edge. That is to say, one edge needs to be traversed from the node of the user 321 to the node of group 312. Hence, the distance between the node of user 321 and the node of group 312 is 1.

The following Table 1 shows the distances between the users and the groups in the tree 300 shown in FIG. 3.

TABLE 1

| User | Group and Distance List |
| --- | --- |
| User 321 | Group 312 (1), Group 311 (2), Group 314 (1) |
| User 322 | Group 312 (1), Group 311 (2) |
| User 323 | Group 312 (1), Group 311 (2) |
| User 324 | Group 313 (1), Group 311 (2) |
| User 325 | Group 313 (1), Group 311 (2) |
| User 326 | Group 314 (1) |
| User 327 | Group 314 (1) |

In Table 1, a value in the parentheses on the right of each group represents the distance between a corresponding user to the group. For example, group 311 (2) in the row where user 323 lies indicates that the distance between the user 323 and group 311 is 2.

Based on Table 1, the distances between all users may be obtained. In an embodiment, when the distance between the nodes of two users is calculated, the common group or the common node for the two users may be determined first, and then the distances between the nodes of the users and the common node may be added up. For example, user 321 and user 322 belong to group 312, and the distance between the node of user 321 and the node of user 322 is 2. In addition, user 321 and user 324 belong to group 311, and the distance between the node of user 321 and the node of user 324 is 4.

In an embodiment, the distance between the user and the group to which the user belongs is the minimum number of edges traversed from the user to reach the group. After the common group or the common node of two users is determined, the minimum distances between the nodes of the users and the common node are added up. For example, user 321 and user 323 belong to both group 312 and group 311. The distance from the node of user 321 to the node of user 323 through the node of group 312 is two, while the distance from the node of user 321 to the node of user 323 through the node of group 311 is 4. In this embodiment, the minimum distance 2 is selected as the distance between the user 321 and the user 323.

For the enterprise fulltext search engine, the company may include a lot of groups and personnel. A background server may be established to calculate the group to which the user belongs and the distance between the user and the group. The background server may traverse all groups following Depth-First-Search (DFS).

Figure 4:
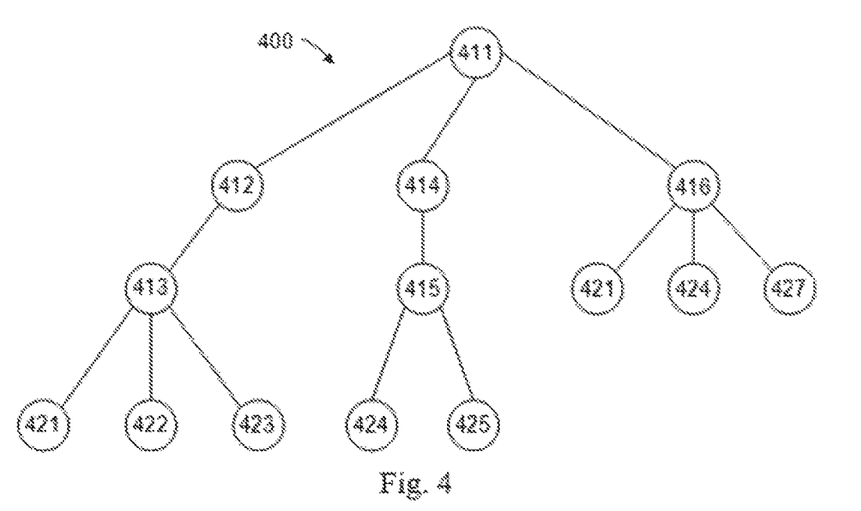
FIG. 4 illustrates a schematic diagram of a tree for representing relevance between a plurality of users according to an embodiment of the present disclosure.

FIG. 4 illustrates a schematic diagram of a tree for representing relevance between a plurality of users according to an embodiment of the present disclosure. As shown in FIG. 4, the tree 400 shows a tree of a total organization, i.e., a tree of group 411. The group 411 includes group 412, group 414 and group 416. Group 412 includes group 413. Group 414 includes group 414. User 421, user 422 and user 423 belong to group 413. User 424 and user 425 belong to group 415. User 421, user 424 and user 427 belong to group 416. The method for calculating the distance between the nodes of users described with reference to FIG. 3 also applies to the tree shown in FIG. 4.

In some embodiments, when the distance between the users is calculated, a determination as to whether two users belong to the same group of the organization is made, and sub-trees corresponding to the group are located in the tree. Then, the distance between two nodes in the tree is calculated.

For example, in the tree 400 shown in FIG. 4, user 421 belongs to group 413, user 424 belongs to group 415, and user 421 and user 424 further belong to another group, i.e., group 416. In this case, in addition to the group 411 as the total organization, user 421 and user 424 are determined to belong to the same group 416. Accordingly, the distance between the node of user 421 and the node of user 424 is determined as 2, as described above.

Hereinafter, determining the relationship or the relevance between the second user and first user based on the distance obtained from the calculation as described above will be described.

In an example, a power function with the distance as a variable may be used to calculate the relationship or the relevance between the users as a factor or weight for a final information relevance. For example, the factor Rweight may be calculated according to the following power function:

$$R\text{weight}=1+x^{-2} \quad (1)$$

where x is the distance between the first user and the second user.

In this embodiment, for example, in the tree shown in FIG. 3, when the documents are searched in response to the request of the user 321, the value of Rweight for the document written by user 322 is 1.25 (because the distance between user 321 and user 322 is 2), and the value of Rweight for the document written by user 324 is 1.0625 (because the distance between user 321 and user 324 is 4). The smaller the distance between the first user and the second user is, the larger the value of Rweight is. It should be appreciated that the power function may be customized, and a power function different from the formula (1) may be employed to generate different factors or weights in different scenarios.

Further referring to FIG. 2, at block 206, a final information relevance (also referred to as "second relevance") between the second information and the first information is determined based on the first relevance. At this block, the second relevance between the searched information and the desired information is determined based on the first relevance determined at the block 204.

In some embodiments, initial information relevance between the second information and the first information is adjusted based on the first relevance between the first user and the second user, so as to obtain the second relevance as the final information relevance. The initial information relevance is information relevance between the searched information and the desired information as calculated in a conventional manner.

In an example, the final information relevance may be calculated according to the following formula:

$$\text{Relevance}(\text{User},\text{Document})=R\text{weight} \times C\text{weight} \quad (2)$$

where Relevance (User, Document) represents the final information relevance between the desired information of the first user and the searched document information, and Cweight represents the initial information relevance as described above.

In this example, the value of Rweight is multiplied by the value of Cweight to obtain the final information relevance. The smaller the distance between the first user and the second user is, the larger the value of the factor Rweight is, and the larger the value of the final information relevance is. In this example, if other factors are the same, the smaller the distance between the first user and the second user is, the higher the final information relevance between the first information and the second information is.

For example, in the tree of FIG. 3, when the search is performed in response to the request of user 321, the Rweight for the document written by user 322 is 1.25, the Rweight for the document written by user 324 is 1.0625, and the final information relevance between the document written by user 322 and the desired information of user 321 is higher.

For example, in the tree of FIG. 4, when the search is performed in response to the request of user 421, the minimum distance between user 424 and user 421 is 2, the Rweight for the document written by user 424 is 1.25, and the final information relevance between the document written by the user 424 and the desired information of the user 421 is higher.

In the above example, the final information relevance is represented as a product of Rweight and Cweight, as shown by formula (2). However, it should be appreciated that other formulas between Rweight and Cweight may be employed, as long as Rweight is used to adjust or modify Cweight to obtain the final information relevance based on the Rweight.

Further referring to FIG. 2, at block 208, the second information is presented to the first user based at least in part on the second relevance. At this block, the searched information is presented to the first user based on the final information relevance obtained at block 206.

In some embodiments, positions of the searched information in the pieces of information to be presented to the first user are determined based on the final information relevance. In the embodiment, the searched information with higher final information relevance is returned to the first user with a higher priority.

For example, in the tree of FIG. 3, when the search is performed in response to the request of user 321, the document written by user 322 is returned to the user 321 with a higher priority, as compared with the document written by user 324.

It may be appreciated that in other embodiments, the users associated with the searched information may also be the groups as described above. In this case, the final information relevance between the searched information and the desired information is determined based on the distance between the searcher and the respective groups.

Figure 5:
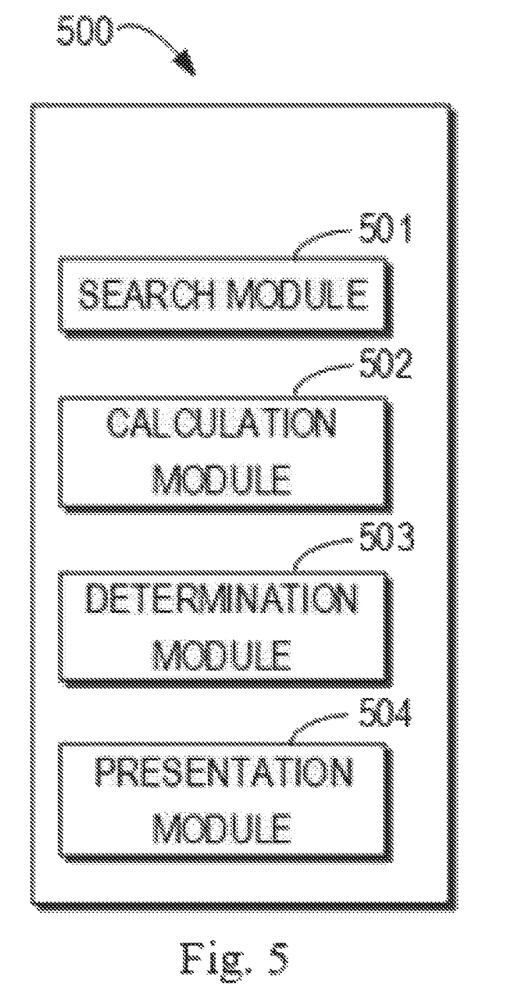
FIG. 5 illustrates a block diagram of an apparatus according to an embodiment of the present disclosure.

FIG. 5 illustrates a block diagram of an apparatus according to an embodiment of the present disclosure. It may be appreciated that the apparatus 500 shown in FIG. 5 may be implemented at the user terminal 101 and/or the network 103 shown in FIG. 1. As shown in FIG. 5, the apparatus 500 may include a search module 501, a calculation module 502, a determination module 503 and a presentation module 504. The search module 501 may be configured to, in response to the request of the first user for the first information, search the database to obtain the second information. The calculation module 502 may be configured to determine the first relevance between the second user associated with the second information and the first user. The determination module 503 may be configured to determine the second relevance between the second information and the first information based on the first relevance. The presentation module 504 may be configured to present the second information to the first user based at least in part on the second relevance.

In some embodiments, the calculation module 502 may be further configured to determine a first node representing the first user and a second node representing the second user in the tree representing the relevance between the users, and to determine the first relevance by calculating the distance between the first node and the second node.

In some embodiments, the calculation module 502 may include a distance calculation module that is configured to calculate the minimum number of edges traversed from the first node to the second node, as the distance.

In some embodiments, the distance calculation module may be further configured to, in response to determining whether the first user and the second user belong to the same group in the organization, locate the sub-tree corresponding to the group in the tree, and to calculate the distance between the first node and the second node in the tree.

In some embodiments, the calculation module 502 may include a tree generation module that is configured to generate the tree based on the structural diagram of the organization to which the users belong.

In some embodiments, the calculation module 502 may include a relevance calculation module that is configured to determine the first relevance based on the power function with the distance as the variable.

In some embodiments, the determination module 503 may be further configured to adjust the initial relevance between the first information and the second information based on the first relevance, to obtain the second relevance.

In some embodiments, the presentation module 504 may be further configured to determine, based on the second relevance, the position of the second information in the pieces of information to be presented to the first user.

The modules included in the apparatus 500 may be implemented in various manners, including software, hardware, firmware and any combination thereof. In an embodiment, one or more modules may be implemented using software and/or firmware, e.g., machine-executable instructions stored in a storage medium. In addition to the machine-executable instructions or alternatively, all or partial modules in the apparatus 500 may be at least partially implemented by one or more hardware logic components. By way of example and not limitation, exemplary types of the hardware logic components that may be used comprise Field-Programmable Gate Arrays (FPGAs), Application Specific Integrated Circuits (ASICs), Application Specific Standard Parts (ASSPs), System on Chip (SOC), Complex Programmable Logic Device (CPLD) and the like.

It should be noted that although several modules of the apparatus have been mentioned in the above detailed depiction, such partitioning is merely exemplary and non-mandatory. In practice, according to the embodiments of the present disclosure, the features and the functions of the above-described two or more modules may be embodied in one module. On the contrary, the features and the functions of the above-described one module may be further divided into and embodied in more modules.

Figure 6:
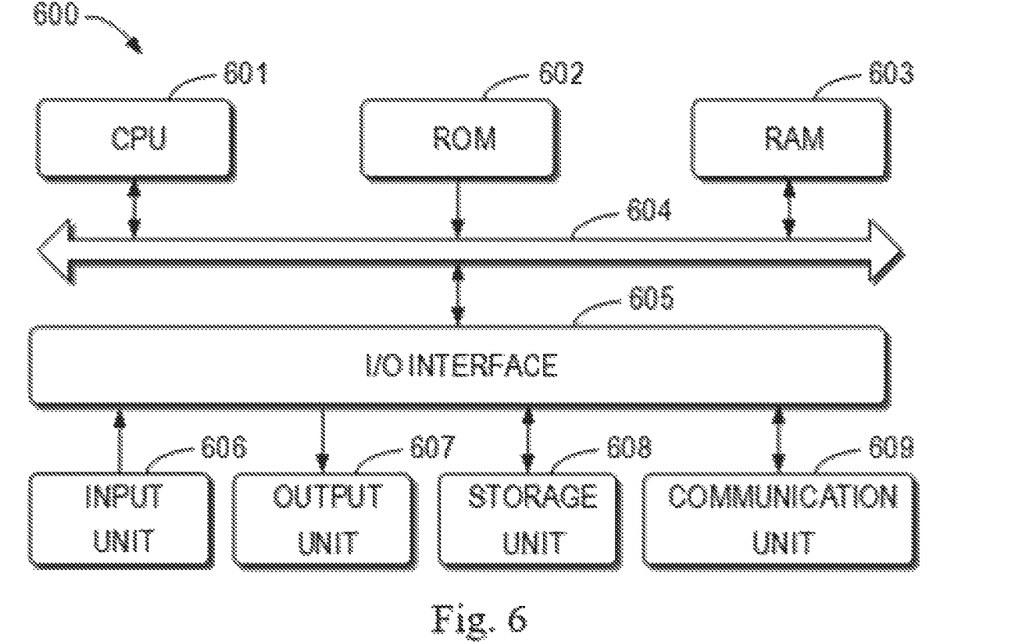
FIG. 6 illustrates a block diagram of an electronic device adapted to implement an embodiment of the present disclosure.

FIG. 6 illustrates a structural schematic diagram of an electronic device according to an embodiment of the present disclosure. The electronic device 600 shown in FIG. 6 may be used for implementing the information processing method 200 according to the embodiment shown in FIG. 2.

As shown in FIG. 6, the electronic device 600 includes a central processing unit (CPU) 601 which is capable of performing various suitable actions and processes in accordance with computer program instructions stored in a read only memory (ROM) 602 or computer program instructions loaded from a storage unit 608 to a random access memory (RAM) 603. In the RAM 603, various programs and data required in the operation of the electronic device 600 may also be stored. The CPU 601, the ROM 602 and the RAM 603 are connected to one another via a bus 604. An input/output (I/O) interface 605 is also connected to the bus 604.

A plurality of components in the electronic device 600 are connected to the I/O interface 605, the components include: an input unit 606 such as a keyboard, a mouse, etc.; an output unit 607, such as various displays, speakers, etc.; the storage unit 608 such as a magnetic disk, an optical disk, etc.; and a communication unit 609 such as a network card, a modem, a radio communication transceiver, etc. The communication unit 609 allows the device 600 to exchange information/data with other devices via a computer network such as Internet and/or various telecommunication networks.

For example, the central processing unit 601 executes the information processing method 200. For example, in some embodiments, the information processing method 200 may be implemented as a computer software program, which is tangibly included in a machine-readable medium such as the storage unit 608. In some embodiments, part or all of the computer program may be loaded and/or installed to the device 600 via the ROM 602 and/or the communication unit 609. When the computer program is loaded to the RAM 603 and executed by the CPU 601, one or more blocks of the aforesaid information processing method 200 may be performed. Alternatively, in other embodiments, the CPU 601 may be configured to execute the information processing method 200 in any other suitable manners (for example, by virtue of the firmware).

Those skilled in the art should appreciate that the operations of the method of the present disclosure may be implemented by using a general-purpose computing device, which may be integrated on a single computing device, or distributed over a network comprised of a plurality of computing devices. Optionally, they may be implemented by using program codes executable by the computing device so that they may be stored in a storage device and executed by the computing device, or they are respectively fabricated into respective integrated circuit modules, or multiple modules therein are implemented in a way of being fabricated into a single integrated circuit module. As such, the present disclosure is not limited to any specific combination of hardware and software.

In the information processing method and information processing apparatus according to embodiments of the present disclosure, a new boost factor for fulltext search information relevance is introduced to measure the importance or the relevance of the searched information based on the relevance between the searcher and the users associated with the searched information (e.g., based on the determination of the distance in the tree), so that the information more relevant to the point of interest of the searcher may be returned with a high priority. As compared with the conventional fulltext search engine which does not take into account the relevance between the searcher and the document user, the present disclosure avoids return of irrelevant documents of less interest with a high priority.

Although specific embodiments have been illustrated and described herein, those skilled in the art should appreciate that the illustrated and described specific embodiments may be replaced by various alternative and/or equivalent implementations without departing from the scope of the present disclosure. The present disclosure is intended to cover any changes or variations of specific embodiments described herein.

We claim:

1. A method of information processing, comprising:
   in response to a request of a first user for first information, searching a database to obtain second information;
   determining a first relevance between a second user associated with the second information and the first user;
   determining a second relevance between the second information and the first information based on the first relevance; and
   presenting the second information to the first user based at least in part on the second relevance,
   wherein determining the first relevance comprises:
      determining a first leaf node representing the first user and a second leaf node representing the second user from a graphical tree structure representing a relevance between a plurality of users including the first user and the second user; and
      determining the first relevance by calculating a distance between the first leaf node and the second leaf node of the graphical tree structure.

2. The method of claim 1, wherein the graphical tree structure includes one or more internal nodes, and a plurality of edges interconnecting the one or more internal nodes, the first leaf node, and the second leaf node, and wherein calculating the distance comprises:
   traversing, from the first leaf node to the second leaf node, a minimum number of edges from among the plurality of edges included in the graphical tree structure,
   wherein the traversed minimum number of edges represents the calculated distance between the first leaf node and the second leaf node.

3. The method of claim 2, wherein calculating the distance further comprises:
   in response to determining that the first and second users belong to a same first group in an organization:
      determining a first internal node from among the one or more internal nodes that represents the first group; and
      traversing, from the first leaf node to at least the first internal node and ultimately to the second leaf node, the minimum number of edges from among the plurality of edges included in the graphical tree structure.

4. The method of claim 3 wherein calculating the distance further comprises:
   in response to determining that the first user further belongs to a second group in the organization, the second group being different from the first group:
      determining a third leaf node representing the first user from the graphical tree structure;
      determining a second internal node from among the one or more internal nodes that represents the second group;
      traversing, from the first leaf node to at least the first internal node and ultimately to the second leaf node, a first number of edges from among the plurality of edges included in the graphical tree structure;
      traversing, from the third leaf node to at least the second internal node and ultimately to the second leaf node, a second number of edges from among the plurality of edges included in the graphical tree structure; and obtaining the minimum number of edges from the lesser of the first number of edges and the second number of edges.

5. The method of claim 1, wherein the graphical tree structure is generated based on a structural diagram of an organization to which the plurality of users belong.

6. The method of claim 1, wherein determining the first relevance by calculating the distance between the first leaf node and the second leaf node comprises:

determining the first relevance based on a power function, the power function using the distance as a variable.

7. The method of claim 1, wherein determining the second relevance comprises:

adjusting, based on the first relevance, an initial relevance between the first information and the second information to obtain the second relevance.

8. The method of claim 7, wherein presenting the second information comprises:

determining, based on the second relevance, a position of the second information in pieces of information to be presented to the first user.

9. An electronic device, comprising:

a processing unit; and a memory coupled to the processing unit and having instructions stored thereon, the instructions, when being executed by the processing unit, causing the device to perform acts including:

in response to a request of a first user for first information, searching a database to obtain second information;

determining a first relevance between a second user associated with the second information and the first user;

determining a second relevance between the second information and the first information based on the first relevance; and presenting the second information to the first user based at least in part on the second relevance, wherein determining the first relevance comprises:

determining a first leaf node representing the first user and a second leaf node representing the second user from a graphical tree structure representing a relevance between a plurality of users including the first user and the second user; and determining the first relevance by calculating a distance between the first leaf node and the second leaf node of the graphical tree structure.

10. The device of claim 9, wherein the graphical tree structure includes one or more internal nodes, and a plurality of edges interconnecting the one or more internal nodes, the first leaf node, and the second leaf node, and wherein calculating the distance comprises:

traversing, from the first leaf node to the second leaf node, a minimum number of edges from among the plurality of edges included in the graphical tree structure, wherein the traversed minimum number of edges represents the calculated distance between the first leaf node and the second leaf node.

11. The device of claim 10, wherein calculating the distance further comprises:

in response to determining that the first user and the second user belong to a same first group in an organization:

determining a first internal node from among the one or more internal nodes that represents the first group; and traversing, from the first leaf node to at least the first internal node and ultimately to the second leaf node, the minimum number of edges from among the plurality of edges included in the graphical tree structure.

12. The device of claim 9, wherein the graphical tree structure is generated based on a structural diagram of an organization to which the plurality of users belong.

13. The device of claim 9, wherein determining the first relevance by calculating the distance between the first leaf node and the second leaf node comprises:

determining the first relevance based on a power function, the power function using the distance as a variable.

14. The device of claim 9, wherein determining the second relevance comprises:

adjusting, based on the first relevance, an initial relevance between the first information and the second information to obtain the second relevance.

15. The device of claim 14, wherein presenting the second information comprises:

determining, based on the second relevance, a position of the second information in pieces of information to be presented to the first user.

16. A computer program product for information processing, the computer program product comprising:

a non-transitory computer readable medium encoded with computer-executable code, the code configured to enable the execution of:

in response to a request of a first user for first information, searching a database to obtain second information;

determining a first relevance between a second user associated with the second information and the first user;

determining a second relevance between the second information and the first information based on the first relevance; and presenting the second information to the first user based at least in part on the second relevance;

wherein determining the first relevance comprises:

determining a first leaf node representing the first user and a second leaf node representing the second user from a graphical tree structure representing a relevance between a plurality of users including the first user and the second user; and determining the first relevance by calculating a distance between the first leaf node and the second leaf node of the graphical tree structure.

* * * * *